(12) United States Patent
Milburn et al.

(10) Patent No.: US 8,807,633 B2
(45) Date of Patent: Aug. 19, 2014

(54) CAB SUSPENSION SYSTEM FOR AN OFF-ROAD VEHICLE

(75) Inventors: Rowland James Milburn, Naperville, IL (US); Michael Bakken, Fargo, ND (US); Salvatore Virgilio, Woodbridge, IL (US); David Larry Tveito, West Fargo, ND (US); David Sheldon Booth, Phoenix, AZ (US); John Thomas Rasset, Barnesville, MN (US); Jason Keith Novacek, West Fargo, ND (US); Dallas Lee Jorgenson, Fargo, ND (US); Chad Alry Bautz, Fargo, ND (US); Michael Bunnell, Burr Ridge, IL (US); Shane Michael Scott, Bolingbrook, IL (US); Daniel John Zurn, Bolingbrook, IL (US); Russell Stoltman, Argusville, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/528,655

(22) Filed: Jun. 20, 2012

(65) Prior Publication Data

US 2013/0341966 A1    Dec. 26, 2013

Related U.S. Application Data

(60) Provisional application No. 61/499,549, filed on Jun. 21, 2011.

(51) Int. Cl.
*B62D 33/077* (2006.01)
*B62D 33/06* (2006.01)
*B60R 21/13* (2006.01)

(52) U.S. Cl.
CPC ........ *B62D 33/0604* (2013.01); *B62D 33/0617* (2013.01); *B60R 21/131* (2013.01)
USPC ...................... 296/190.07; 296/35.1; 280/756

(58) Field of Classification Search
USPC ........ 296/1.03, 35.1, 190.01, 190.03, 190.07; 280/756; 180/89.12; 267/33, 195, 225, 267/248, 292; 248/560, 565, 618, 624, 638
See application file for complete search history.

(56) References Cited

U.S. PATENT DOCUMENTS

| | | |
|---|---|---|
| 3,656,799 A | 4/1972 | Malm et al. |
| RE29,123 E | 1/1977 | Malm et al. |
| 4,275,918 A | 6/1981 | Franco |
| 4,340,127 A | 7/1982 | Broberg |
| 4,392,546 A | 7/1983 | Brown et al. |
| 4,427,090 A | 1/1984 | Fredriksen et al. |
| 5,368,118 A | 11/1994 | Hoefle |
| 5,553,911 A | 9/1996 | Bodin et al. |

(Continued)

*Primary Examiner* — Glenn Dayoan
*Assistant Examiner* — Jason S Daniels
(74) *Attorney, Agent, or Firm* — Sue C. Watson

(57) ABSTRACT

A suspension system for a cab of an off-road vehicle includes a superstructure configured to receive a cab frame. The superstructure forms a framework, the corners of which receive suspension assemblies and dampers. The suspension assemblies include one or more springs or resilient elements to resist suspension motion, and the dampers provide dampening of the motion. Lateral and longitudinal suspension motions are resisted by links between the corners of the superstructure. An anti-roll bar reduces roll. The entire suspension system may be pre-assembled and then joined to the vehicle chassis frame. The cab frame may then be placed on the suspension system. Parts of the suspension system may interface with and be housed by roll-over protective structures.

20 Claims, 4 Drawing Sheets

(56) References Cited

U.S. PATENT DOCUMENTS

| | | | | |
|---|---|---|---|---|
| 5,964,310 A | * | 10/1999 | Gyllner | 180/89.13 |
| 6,206,422 B1 | | 3/2001 | Goddard | |
| 6,273,203 B1 | | 8/2001 | Paggi et al. | |
| 6,340,201 B1 | * | 1/2002 | Higuchi | 296/190.07 |
| 6,408,970 B1 | * | 6/2002 | Eng | 180/89.12 |
| 6,467,581 B2 | | 10/2002 | Bavendiek et al. | |
| 6,758,294 B2 | | 7/2004 | Peddycord et al. | |
| 6,986,545 B2 | * | 1/2006 | Nilsson et al. | 296/190.07 |
| 7,029,059 B2 | | 4/2006 | Bernhardt et al. | |
| 7,131,686 B1 | * | 11/2006 | Jo et al. | 296/190.03 |
| 7,198,125 B2 | | 4/2007 | Skelcher et al. | |
| 7,249,448 B2 | | 7/2007 | Murphy et al. | |
| 7,300,100 B2 | | 11/2007 | McLean et al. | |
| 7,364,223 B2 | * | 4/2008 | Mori et al. | 296/190.07 |
| 7,695,054 B2 | * | 4/2010 | Haeusler et al. | 296/190.07 |
| 7,744,149 B2 | | 6/2010 | Murray et al. | |
| 7,950,726 B2 | | 5/2011 | Brown | |
| 8,240,745 B2 | * | 8/2012 | Yamamoto et al. | 296/190.03 |
| 2004/0159995 A1 | * | 8/2004 | Pavuk | 267/248 |
| 2009/0045000 A1 | | 2/2009 | Brown | |
| 2009/0167057 A1 | | 7/2009 | Walter et al. | |
| 2009/0289472 A1 | * | 11/2009 | Catanzarite et al. | 296/190.07 |
| 2009/0302640 A1 | | 12/2009 | Murray et al. | |
| 2010/0219009 A1 | | 9/2010 | Turco et al. | |
| 2011/0079457 A1 | | 4/2011 | Virtanen et al. | |
| 2012/0193157 A1 | * | 8/2012 | Rasset et al. | 180/89.13 |

* cited by examiner

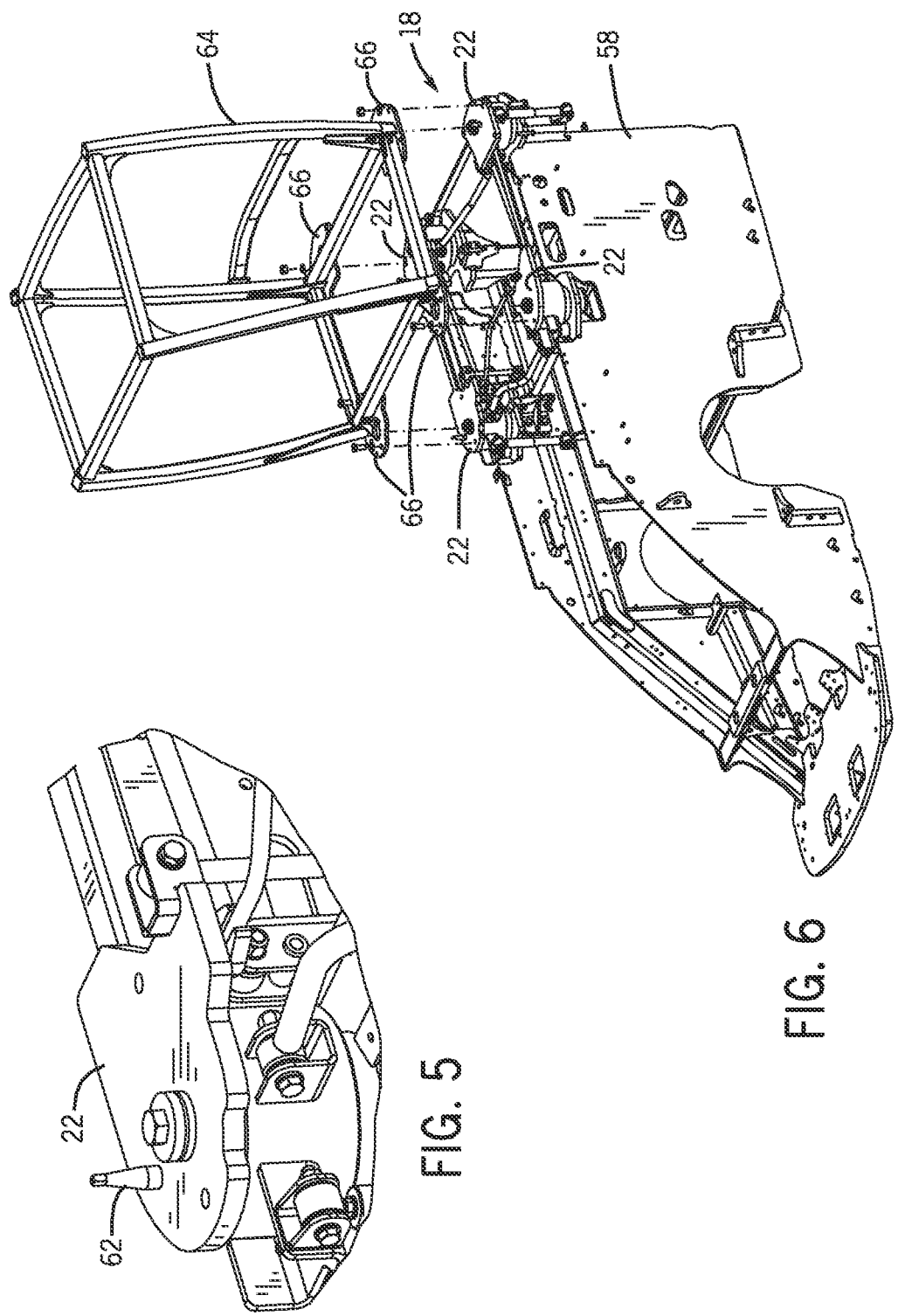

CAB SUSPENSION SYSTEM FOR AN OFF-ROAD VEHICLE

CROSS REFERENCE TO RELATED APPLICATIONS

This application is a Non provisional Patent Application of U.S. Provisional Patent Application No. 61/499,549, entitled "Cab Suspension System for an Off-Road Vehicle", filed Jun. 21, 2011, which is herein incorporated by reference.

BACKGROUND

The invention relates generally to off-highway vehicles, such as tractors, and more particularly to techniques for mounting operator cabs on such vehicles.

A wide range of off-highway vehicles have been developed for various purposes. In simple vehicles, seats and other operator supports may be sufficient, and these may be mounted on various forms of springs and other suspension components. However, in larger or more complex vehicles, such as tractors, a partially or fully enclosed cab is more desirable, providing one or more operators with a comfortable location from which the vehicle may be transported and used for work purposes for hours on end. Such cabs, sometimes referred to as "operator environments" also provide a central location to which controls and operator interfaces may be fed, and from which most or all of the vehicle functions may be easily controlled.

Conventional cab mounting systems typically mount the cab to the vehicle chassis via rubber isolators beneath the corners of the cab frame. This type of mounting does provide some reduction in noise and vibration transmission from the chassis during vehicle operation, but do not mitigate higher amplitude jolts and provide little isolation of frequencies such as those seen on tracked vehicles. Over a typical work period of several or many hours, resulting noise and vibration fatigue the operator and ultimately reduce his or her productivity.

There is a need in the field for improved arrangements for mounting cabs to vehicle frames and chassis, and a particular need for techniques that will provide improved operator comfort, while not altering the utility of conventional cabs. The new techniques must also be capable of adaptation for a range of vehicle sizes and configurations, and should present facilities in both manufacturing and transport of the components and subsystems involved.

BRIEF DESCRIPTION

The present invention provides a novel system and method for mounting a cab on an off-road vehicle designed to respond to such needs. The inventive arrangements provide for suspension of the cab superstructure on the frame or chassis of the vehicle. The design provides substantial improvements in ride comfort and associated productivity of the vehicle operator by reducing road vibration transmitted to the cab from tire lugs or tracks, while absorbing sudden jolts as the vehicle moves over rough terrain. It can be adapted to various sizes, weights and configurations of cabs and vehicle structures, supporting, in certain currently contemplated embodiments 2000 pound (900 Kg) cabs.

The inventive structures provide suspension subsystems that are placed between the cab and vehicle frame, and that can be adapted to the cab and frame geometries. The design is also capable of layout and construction in assembly lines or manufacturing cell production.

DRAWINGS

These and other features, aspects, and advantages of the present invention will become better understood when the following detailed description is read with reference to the accompanying drawings in which like characters represent like parts throughout the drawings, wherein:

FIG. 5 is a detail view of a pin arrangement that facilitates mounting of the cab frame to the suspension system; and FIG. 6 is a perspective view illustrating mounting of a vehicle cab frame to the suspension system.

DETAILED DESCRIPTION

Figure 1:
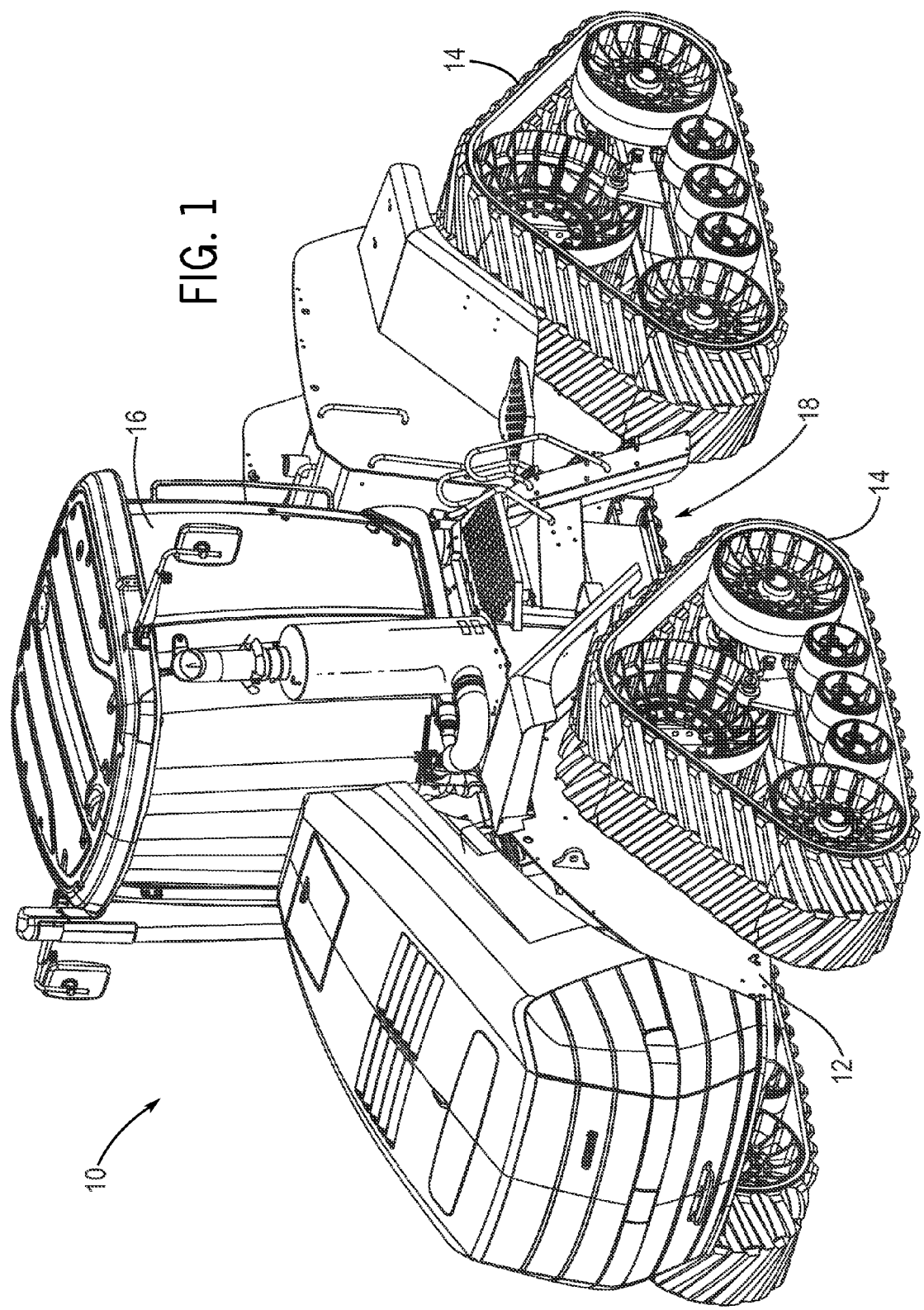
FIG. 1 is a perspective view of an off-road vehicle utilizing a cab suspension system in accordance with the present disclosure.

The following discussion describes an exemplary embodiment of the inventive cab suspension system as it might be used on a work vehicle, tractor, combine, or any other off-road vehicle. The field of off-road vehicles is somewhat unique insomuch as suspension systems must allow for both road travel at acceptable speeds, as well as transport over extremely rough terrain, such as in plowed fields, undeveloped lands, worksites and so forth. The design utilizes a four-link system, including rubber isolators and bumpers, springs, dampers, and a torsion bar, for various ride improvement components that combine to absorb normal operating shocks, while gradually increasing resistance to provide soft end of motion.

In the presently contemplated design described below, springs captured by rubber end caps are mounted vertically in four corners of the system. These allow for spring force control of loading during normal operating vertical motion with isolation of noise and vibration. The springs also provide roll and pitch resistance.

Cab roll under normal conditions is controlled by an anti-roll bar mounted on the vehicle frame with drop links connecting to the cab suspension superstructure (the upper components of the suspension system that connect to the cab frame). The torsion bar helps to keep the cab level by transferring offsetting vertical forces to combat cab roll motion. Moreover, both roll and pitch motions are dampened by dampers located at the four corners of the suspension system. Motion is further dampened with increasing cab travel when motion snubbing rubber down-stops and up-stops come into contact with the chassis frame and/or roll-over protective structures (ROPS). The shape of the down-stop and the up-stop increases resistance per distance compressed. Ultimately, rubber stops inside the damper are engaged, again with increasing resistance per distance compressed. The dampening and motion resisting components themselves become engaged in increasing frequency, combining for increased resistance over the total cab motion stroke, thus providing smooth and gradual motion at the end of stroke. In addition, the down-stops and up-stops also ensure that the dampers are never taken to full stroke by heavy cabs.

The front-to-back and side-to-side motion is controlled by the longitudinal links and panhard bars. These links are mounted between the cab suspension superstructure and the vehicle chassis to minimize front-to-back and side-to-side motion, respectively.

In accordance with a presently contemplated embodiment, the cab suspension superstructure of the system connects to the cab frame at four cab mounting pads and ROPS tubes. The dampers, longitudinal links, panhard bars, drop links, downstops and ROPS mounting parts are assembled to it, reducing assembly time in the main vehicle assembly line or manufacturing cell. The cab suspension system is assembled to the vehicle frame prior to placement of the cab on the cab suspension superstructure of the system. All of the connecting joints are bolted, including the four ROPS bolts, washers, up-stops and locknuts. The top of the cab suspension system has two piloting tapered pins in opposite corners to help align the cab frame to the suspension system. This ensures the line-up of the bolt holes that are utilized to secure the cab frame to the suspension system. The cab superstructure serves as an assembly fixture to align the four ROPS pads. The pins allow the cab to be dropped onto the cab superstructure quickly and places the cab accurately. The cab superstructure incorporates all of the upper suspension mounting features, thus allowing the bottom of the cab to remain flat, or to assume a structural presentation that facilitates its manufacture and transport. Moreover, the suspension superstructure can accommodate many different cabs with less adaptation than known arrangements (with little or no change to the frame).

The chassis frame may be modified to provide mounting points for the links, dampers, torsion bar, and ROPS bolts. The chassis frame also may include an inner ROPS tube that provides a mechanical stop for roll-over motion. The relationship between the outer (on cab superstructure) and inner (on chassis frame) ROPS tubes allow the ROPS bolts to be put in almost pure tension during roll-over, thus providing a robust design. The tube-in-tube design protects the springs, prevents extreme side-to-side motion during roll-over, and allows for any water and dirt that may enter into the ROPS system to exit. This reduces the possibility of rust and dirt buildup in the ROPS system.

FIG. 1 illustrates an exemplary off-road vehicle, in this case an agricultural tractor. It should be understood, however that the suspension system may be used on any suitable type of off-road vehicle, including those for agricultural and construction applications, transport, sport, and so forth. The tractor 10 generally comprises a vehicle body or chassis 12 that may be built around a mechanical frame in a conventional manner. The chassis support the power plant, transmission, and all support systems of the vehicle. As with conventional tractors, the vehicle is moved by tracks 14, some of all of which may be driven by the power plant and transmission. An operator cab 16 is mounted on the chassis frame by a suspension system 18 as described move fully below. It should be noted that while tracks are shown in the figure, other vehicles may use tire drives, or a combination of tires and tracks.

Figure 2:
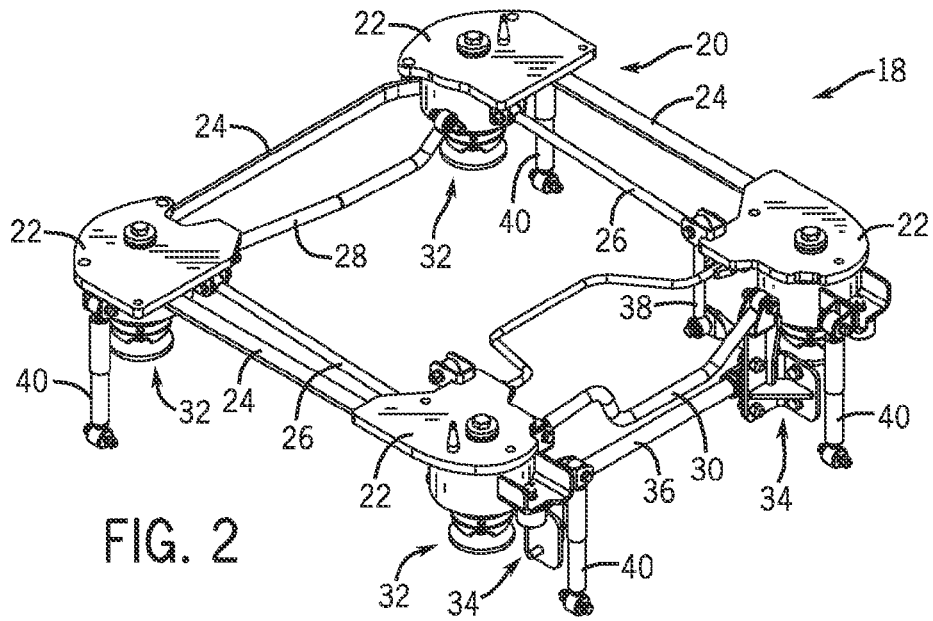
FIG. 2 is a perspective view of an exemplary layout of the cab suspension system.

FIG. 2 is a perspective view of the cab suspension system 18. The suspension system defines a framework structure that is intended to be placed between the chassis frame and the cab. As illustrated, the system includes a suspension superstructure that rests just below the cab when assembled on the vehicle, and interfaces with the cab. The superstructure itself includes pads 22 for supporting matching mounting structures on the cab frame (see, e.g., FIG. 6). Tie rods 24 extend between the pad structures and maintain the spatial relationship between the pads prior to mounting the cab to the superstructure. In certain embodiments, the tie rods may be connected to the pads using a welded connection, bolts, brackets, or another suitable connection. A lateral link 26 is provided on either side of the structure for control of longitudinal suspension motion. Ends of these links may be pivotally connected to the undersides of the pads, as shown. A rear link 28 similarly ties the rear pads to control lateral suspension motion, and may be similarly pivotally connected to undersides of these pads. A front link 30 similarly extends between the front support structures to control lateral suspension motion.

Beneath this superstructure, the system includes mounting assemblies 32 which support the superstructure (and cab) on the vehicle chassis frame as described below. Anti-roll structures 34 are tied to one another by an anti-roll bar 36. Drop links 38 (only one visible in the illustration of FIG. 2) link the front pads 22 to the anti-roll bar 36. At each corner of the system, a damper 40 provides dampening of suspension motion. These dampers may extend between the lower side of the pads 22 (or some other superstructure component) and points on the chassis frame (not shown in FIG. 2) where the suspension system is mounted.

Figure 3:
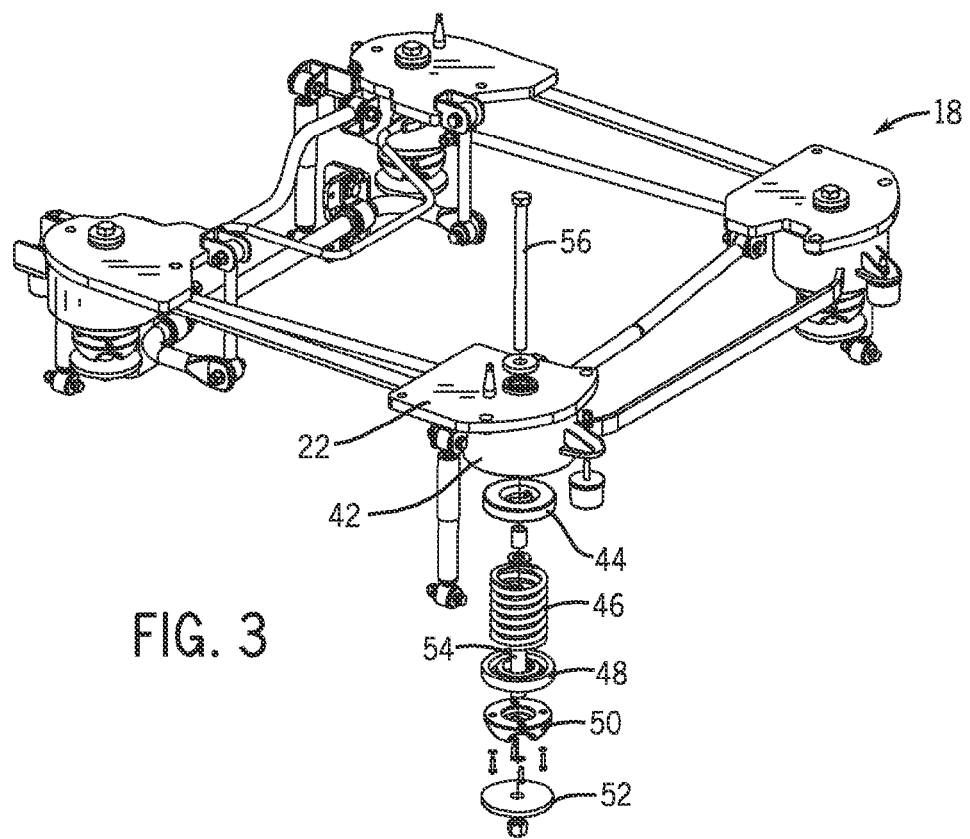
FIG. 3 is a similar perspective view but with certain components of the system exploded out to illustrate a presently contemplated assembly for improved suspension and alignment.

FIG. 3 shows the same suspension system of FIG. 2, but rotated 180 degrees. Also, the structure in FIG. 3 is shown with one of the mounting assemblies exploded to show certain of the suspension system components in accordance with a presently contemplated embodiment. All corners of the system may be similarly constructed. In the illustrated embodiment, the mounting assembly is secured at least partially within a housing 42 formed below the mounting pad. The housing may be formed by a ROPS tube that is part of the suspension superstructure. The assembly includes an upper rubber cup 44, a compression spring 46, a lower rubber cup 48, an up-stop 50 and a retaining plate 52. A spacer 54 extends through these elements, and the entire assembly is held in place by a bolt and nut pair 56. The upper rubber cup 44 maintains the compression spring 46 centered in the outer ROPS tube on the suspension superstructure. The lower rubber cup 48 similarly maintains the compression spring centered in the inner ROPS tube on the tractor frame (not shown). The rubber up-stop 50 controls upward suspension motion, while the lower retaining place accepts forces on the structure when placed in compression by the bolt.

It may be noted that the form of the up-stop allows for increased motion resistance as the structure is progressively compressed. That is, in the illustrated embodiment, rubber portions of this up-stop are thicker near an upper plate on which the rubber portions are mounted. The thinner sections provide a relatively lower spring constant than the thicker portions near the upper plate, such that increasing compression results in a greater spring constant resisting further motion. This, in conjunction with the rubber cups and springs, allows for excellent end-of-travel performance, and smooth and gradual motion at the end of stroke of the assemblies.

Figure 4:
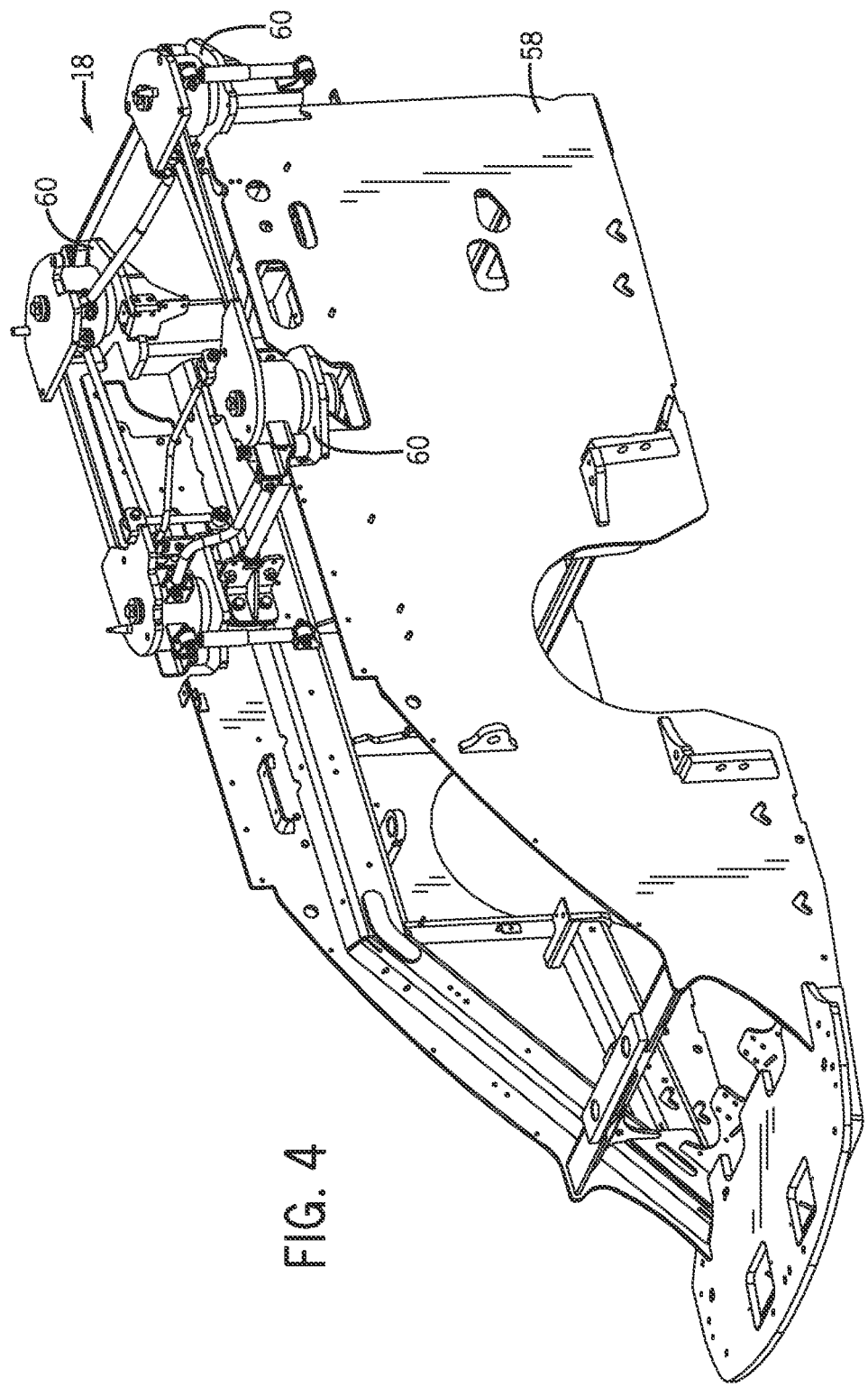
FIG. 4 is a perspective view of the cab suspension system mounted to a vehicle frame.

FIG. 4 shows the suspension system 18 in place on a vehicle chassis frame 58. As noted above, the frame includes suspension platforms 60 or other interfacing structures designed to receive the suspension system 18 and to support the weight of the system and cab. These structures may also provide interfacing for the ROPS tubes as shown. As noted above, the entire suspension system may thus be pre-assembled as a subsystem, and mounted to the chassis frame.

Subsequently, the cab may be mounted to the suspension system as illustrated in FIGS. 5 and 6. In the illustrated embodiment, at least 2 of the pads 22 have alignment pins 62 extending upwardly to receive alignment apertures in the cab structure (see FIG. 5). These pins may be tapered to cause progressive alignment as the cab is lowered onto the suspension system. FIG. 6 illustrates the cab frame 64 being lowered onto the suspension system. Various forms of cab frames may be accommodated, and these will typically include feet or pads 66 that contact and interface with pads 22 of the suspension system. The feet 66 will include one or more apertures for fasteners that will align with similar apertures of the pads 22 as the cab is lowered onto the alignment pins 62. The cab frame may then be bolted to the suspension system and subsequent assembly, wiring, and other operations may be carried out.

The cab suspension described above improves operator ride comfort and productivity by reducing road vibration from tire lugs or tracks, while also absorbing sudden jolts as the vehicle moves over rough terrain. A prototype of the system was tested to provide an operator ride index, in accordance with SAE standard J2834. The ride was found to be superior to front pivot suspension designs, providing improvements of 19-45% in ride index.

While only certain features of the invention have been illustrated and described herein, many modifications and changes will occur to those skilled in the art. It is, therefore, to be understood that the appended claims are intended to cover all such modifications and changes as fall within the true spirit of the invention. For example, the design allows for accommodating different weights of cabs and for non-linear motion response by the use of appropriate spring, such as progressively wound springs, or springs of greater or lesser spring constants. The design also allows for the use of semi-active or active suspension by utilizing electronically controlled dampers rather than traditional gas over orifice dampers to improve ride quality. Electronically controlled air bellows may also be used rather than linear springs to provide semi-active suspension, active suspension, or height control.

The invention claimed is:

1. A cab suspension system for an off-road vehicle, comprising:
   a superstructure having a plurality of pad assemblies for receiving and supporting the cab, wherein each pad assembly comprises a housing and a pad rigidly coupled to the housing;
   a plurality of suspension assemblies secured to the pad assemblies and configured to be mounted on a chassis frame of the vehicle, each suspension assembly comprising at least one compression spring for receiving loading of the cab;
   a plurality of motion dampening elements, a motion dampening element being associated with each of the suspension assemblies; and
   links extending between pad assemblies for resisting lateral and longitudinal suspension motion, wherein at least one of the links comprises:
      a first end rotatably coupled to a pad or a housing of a first pad assembly of the plurality of pad assemblies; and
      a second end rotatably coupled to a pad or a housing of a second pad assembly of the plurality of pad assemblies.

2. The system of claim 1, wherein the superstructure comprises four pad assemblies, disposed generally at corners of the superstructure.

3. The system of claim 1, where at least two of the pad assemblies comprise alignment pins for locating the cab for attachment on the superstructure.

4. The system of claim 1, where each suspension assembly comprises a compression spring and a stop, the spring and stop providing end of travel resistance to suspension motion.

5. The system of claim 4, wherein the stop has a non-uniform spring constant as it is compressed.

6. The system of claim 1, wherein each suspension assembly comprises a tension bolt holding the compression spring and end components on either end of the compression spring in compressive loading.

7. The system of claim 1, wherein each suspension assembly is housed at least partially in a roll-over protective structure.

8. The system of claim 1, comprising a side-to-side antiroll bar extending between corners of the superstructure.

9. The system of claim 8, comprising droplinks coupling the antiroll bar to the superstructure.

10. An off-road vehicle comprising:
    a chassis frame;
    a cab frame; and
    a cab suspension system disposed between and coupled to the chassis frame and the cab frame, wherein the cab suspension system comprises:
       a superstructure having a plurality of pad assemblies for receiving and supporting the cab, wherein each pad assembly comprises a housing and a pad rigidly coupled to the housing;
       a plurality of suspension assemblies secured to the pad assemblies and configured to be mounted on a chassis frame of the vehicle, each suspension assembly comprising at least one compression spring for receiving loading of the cab;
       a plurality of motion dampening elements, a motion dampening element being associated with each of the suspension assemblies;
       links extending between pad assemblies for resisting lateral and longitudinal suspension motion, wherein at least one of the links comprises:
          a first end rotatably coupled to a pad or a housing of a first pad assembly of the plurality of pad assemblies; and
          a second end rotatably coupled to a pad or a housing of a second pad assembly of the plurality of pad assemblies;
       an anti-roll bar configured to reduce roll of the cab; and
       drop links each extending from a respective pad assembly of the plurality of pad assemblies and rotatably coupled to a respective end of the anti-roll bar.

11. The vehicle of claim 10, wherein the chassis frame and the cab suspension system comprise interfacing roll-over protective structures.

12. The vehicle of claim 11, wherein at least part of the cab suspension system is housed at least partially in the roll-over protective structures.

13. A method for supporting a cab on an off-road vehicle, comprising:
    pre-assembling a cab suspension system, wherein the cab suspension system comprises:
       a superstructure having a plurality of pad assemblies for receiving and supporting the cab, wherein each pad assembly comprises a housing and a pad rigidly coupled to the housing;
       a plurality of suspension assemblies secured to the pad assemblies and configured to be mounted on a chassis frame of the vehicle, each suspension assembly comprising at least one compression spring for receiving loading of the cab;
       a plurality of motion dampening elements, a motion dampening element being associated with each of the suspension assemblies; and
       links extending between pad assemblies for resisting lateral and longitudinal suspension motion, wherein at least one of the links comprises:

a first end rotatably coupled to a first pad assembly of the plurality of pad assemblies; and a second end rotatably coupled to a second pad assembly of the plurality of pad assemblies an anti-roll bar configured to reduce roll of the cab; and drop links each extending from a respective pad assembly of the plurality of pad assemblies and rotatably coupled to a respective end of the anti-roll bar.

14. The method of claim 13, comprising mounting the cab suspension system to a vehicle chassis frame.

15. The method of claim 14, wherein the cab suspension system is secured to the vehicle chassis frame at corners of the cab suspension system.

16. The method of claim 14, wherein the cab suspension system is mounted to the vehicle chassis frame by interfacing roll-over protective system components of the cab suspension system and the vehicle chassis frame.

17. The method of claim 16, wherein the roll-over protective system components house at least a part of the cab suspension system.

18. The method of claim 17, wherein the suspension assemblies are housed in the roll-over protective system components.

19. The method of claim 18, comprising securing a cab frame to the superstructure of the cab suspension system.

20. The method of claim 19, wherein the cab frame is lowered onto alignment pins provided on the superstructure of the cab suspension system to align the cab frame on the pads of the superstructure.

* * * * *